(12) United States Patent
Fujiwara

(10) Patent No.: US 6,788,810 B2
(45) Date of Patent: Sep. 7, 2004

(54) OPTICAL CHARACTER RECOGNITION DEVICE AND METHOD AND RECORDING MEDIUM

(75) Inventor: Yoko Fujiwara, Tokyo (JP)

(73) Assignee: Minolta Co., Ltd., Osaka (JP)

( * ) Notice: Subject to any disclaimer, the term of this patent is extended or adjusted under 35 U.S.C. 154(b) by 641 days.

(21) Appl. No.: 09/871,727

(22) Filed: Jun. 4, 2001

(65) Prior Publication Data

US 2002/0012462 A1 Jan. 31, 2002

(30) Foreign Application Priority Data

Jun. 9, 2000 (JP) ......................................... 2000-173733

(51) Int. Cl.⁷ ............................. G06K 9/00; G06K 9/46; G03F 3/08
(52) U.S. Cl. ........................ 382/165; 382/190; 358/523
(58) Field of Search ................................. 382/162, 165, 382/166, 181, 182, 184, 187, 190; 358/2.1, 505, 523, 530; 345/591, 597, 600

(56) References Cited

U.S. PATENT DOCUMENTS

| | | | | |
|---|---|---|---|---|
| 5,471,319 A | * | 11/1995 | Ogawa | 358/445 |
| 5,768,403 A | * | 6/1998 | Suzuki et al. | 358/2.1 |
| 5,835,625 A | * | 11/1998 | Fitzpatrick et al. | 382/165 |
| 6,035,059 A | * | 3/2000 | Kurosawa et al. | 382/164 |
| 6,369,827 B1 | * | 4/2002 | Pan et al. | 345/591 |
| 6,519,630 B1 | * | 2/2003 | Hanawa | 709/206 |
| 6,522,330 B2 | * | 2/2003 | Kobayashi | 345/467 |
| 6,538,756 B1 | * | 3/2003 | Hasegawa et al. | 358/1.11 |

\* cited by examiner

*Primary Examiner*—Andrew W. Johns
*Assistant Examiner*—Amir Alavi
(74) *Attorney, Agent, or Firm*—Burns, Doane, Swecker & Mathis, L.L.P.

(57) ABSTRACT

An image processing method or device invented to reduce the ratio of erroneously recognized non-character elements in optical character recognition (OCR) regarding a color document that includes character images and other types of images, wherein the extracted character image data is checked to determine whether a color change exists in each character image, and wherein if no color change exists, the character image data is converted into character code data, but where a color change does exist, the character image data is not converted into character code data.

9 Claims, 7 Drawing Sheets result of character recognition

OPTICAL CHARACTER RECOGNITION DEVICE AND METHOD AND RECORDING MEDIUM

BACKGROUND OF THE INVENTION

1. Field of the Invention

The present invention relates to a character recognition technology that converts the character image data included in image data into character code data.

2. Description of the Related Art

Using conventional character recognition technology via a conventional optical character recognition (OCR) device, if the document comprises text images only, a 99.5% recognition rate has been attained.

However, where the document includes other types of images such as drawings and photos, part of the drawings or photos (particularly the edges) may be erroneously regarded as characters, and as a result the recognition rate decreases significantly. In particular, where characters and a drawing or a photo are close together, part of the drawing or photo may be regarded as characters.

SUMMARY OF THE INVENTION

An object of the present invention is to resolve the above problem.

Another object of the present invention is to provide an OCR device and method that can prevent erroneous character recognition regarding images that include characters, as well as a recording medium.

Yet another object of the present invention is to provide an OCR device and method that improve the recognition rate by using color information during the optical character recognition regarding a color document comprising character images and other types of images, as well as a recording medium.

These and other objects are attained by an image processor having an obtaining unit that obtains image data that corresponds to the image including character images and other types of images, an extracting unit that extracts the character images from the image data, an detecting unit that checks whether a color change exists in the extracted images based on the extracted image data, and a generating unit that generates character code data based on the image data for the images as to which there is no color change.

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by like reference numbers throughout the several drawings.

DESCRIPTION OF THE PREFERRED EMBODIMENT

An embodiment is explained below with reference to the accompanying drawings. In these drawings, identical numbers indicate identical or equivalent members.

Figure 1:
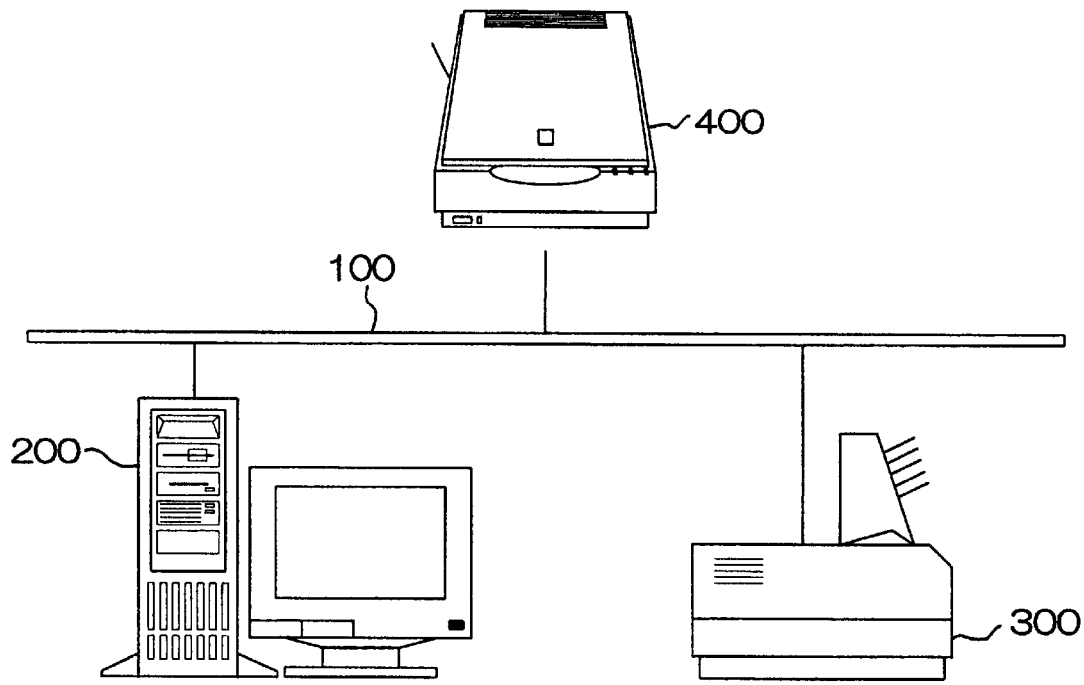
FIG. 1 is a drawing showing the system construction.
Figure 1:
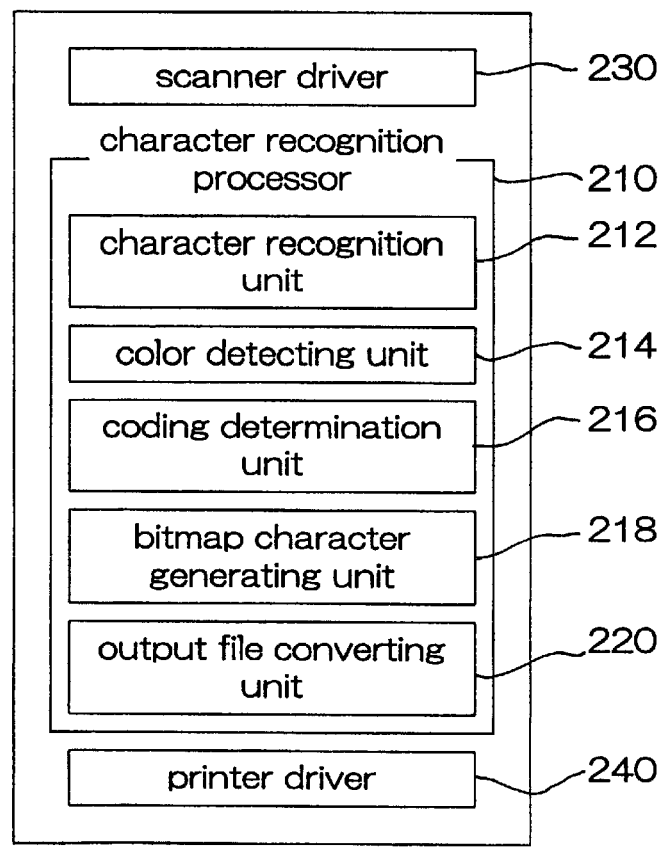

FIG. 1 shows the construction of the system. A computer 200, which comprises an OCR device having a character recognition feature, a printer 300, which comprises an image output device, and a scanner 400, which comprises an image input device, are connected to the network 100. The image output device or the image input device may be equipped with the character recognition feature instead of the computer 200. The image output device is not limited to a printer, and may comprise a display. Further, the image input device is not limited to a scanner, and may comprise a digital input device such as a digital camera or film scanner.

The computer 200 has a character recognition processor 210 and a software program that controls peripheral devices such as a scanner driver 230 and a printer driver 240. For example, setting of the reading parameters for the scanner 400 and issuance of an instruction to begin reading are carried out using the scanner driver 230 via the screen of the computer 200. On the screen of the computer 200 are displayed a Scan/File button by which to instruct a series of operations to read the document, perform the character recognition process and output the results into a file, and a Scan/Print button that instructs a series of operations to perform printing following character recognition.

The character recognition processor 210 extracts character image data from among the image data, and if no color change is detected in the extracted character image data, it converts the character image data into character code data. Character image data including a color change is not converted into character code data. To explain further, the character recognition unit 212 recognizes character image data from among the image data obtained through reading, converts the character image data into character code data based on the result of the determination made by the coding determination unit 216, and outputs the result of the conversion. The character color detecting unit 214 checks for a color change in the character image data recognized by the character recognition unit 212. The coding determination unit 216 determines whether the character image data should be converted into character code data based on the character recognition certainty data output from the character recognition unit 212 and the color change data output from the character color detecting unit 214. The bitmap character generating unit 218 generates character image data in bitmap format to display the character image data that was not converted. The output file converting unit 220 converts the recognized image data into data having a designated file format.

Figure 2:
FIG. 2 is a drawing showing a document that includes a picture placed among characters.
Figure 3:
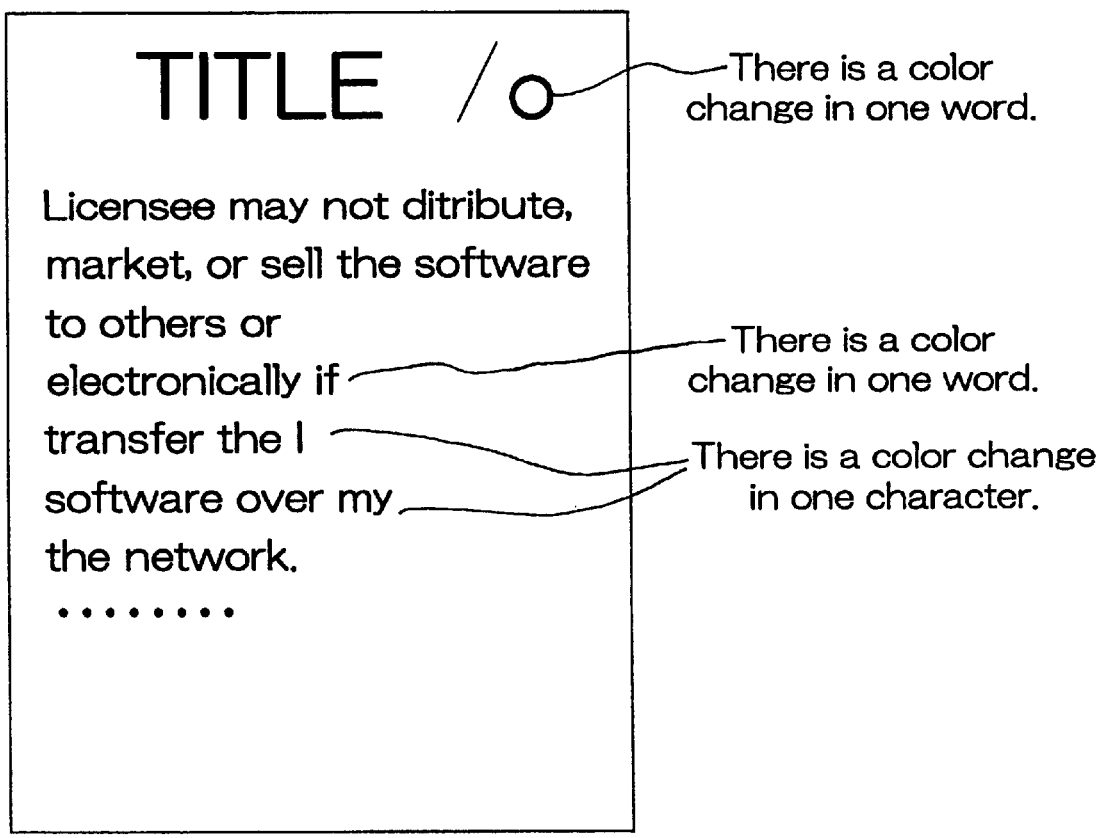
FIG. 3 is a drawing to explain the results of character recognition.

FIG. 2 shows an example of a document including a picture placed among characters. FIG. 3 shows an example of the result of character recognition of the document. Where a document that includes a picture placed among characters is processed, the code data output from the character recognition unit 212 includes characters output because part of the picture was erroneously recognized as characters. The certainty information regarding the recognition of these characters is only marginally different from such information regarding genuine characters. Therefore, the erroneously recognized characters (i.e., picture fragments) cannot be adequately excluded based on the certainty information only. As a result, in the image recognition device that recognizes and outputs characters from among image data, the color of the recognized character is checked and used as a factor by which to determine the certainty of character recognition. If the color of the recognized character is checked and the character is not converted into codes when it falls within certain cases, the possibility of erroneous recognition may be reduced. Certain cases include, for example, a case in which the color changes within one character and a case in which the color changes within one word. Using this feature, all erroneously recognized characters (i.e., picture fragments) are eliminated in the result of processing shown in FIG. 3. Because the character recognition process is performed based on a monochrome binary image, exclusion of erroneously recognized characters using color information is effective as a method to prevent the output of incorrect character codes.

Figure 4:
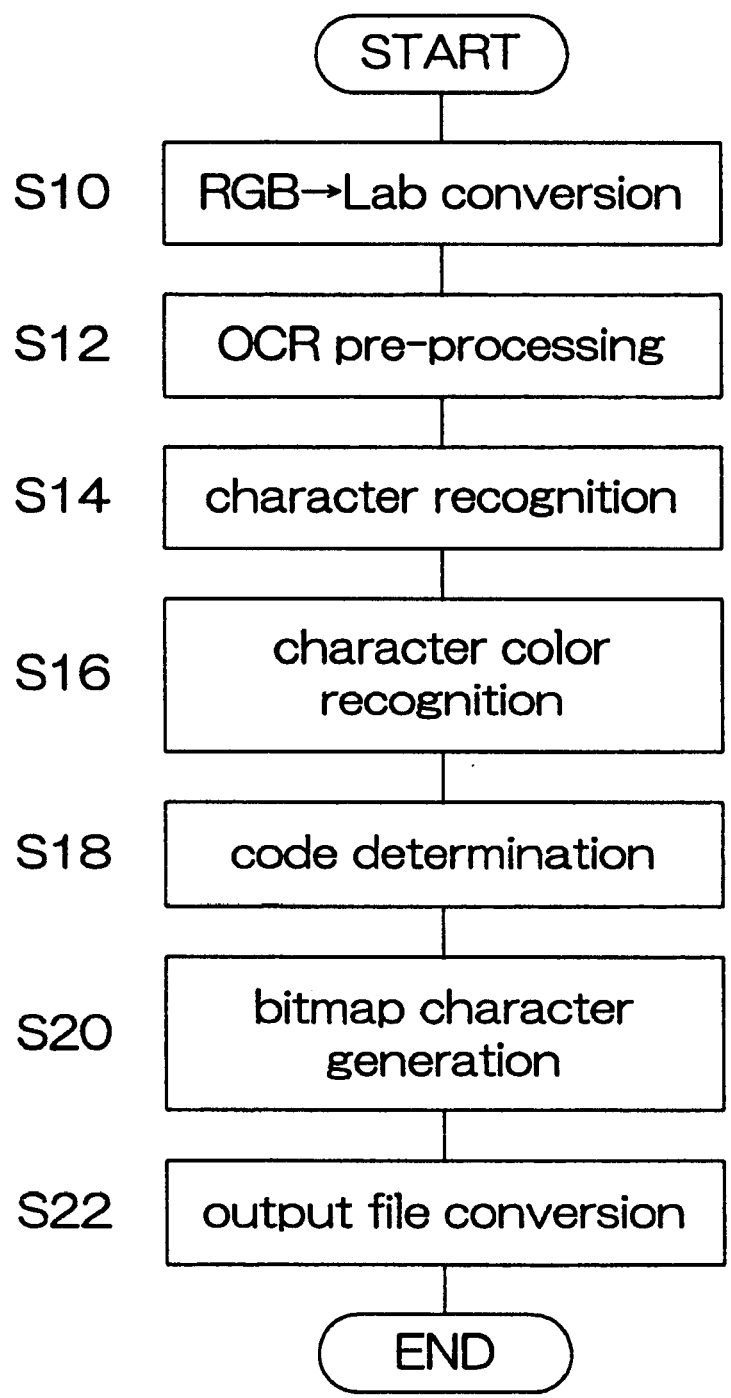
FIG. 4 is a flow chart of the character recognition process.

The sequence of the character recognition process is explained below in sequential order. FIG. 4 shows the sequence of steps that take place in the character recognition processor 210. First, the scanned multi-level RGB image data is converted into Lab color space data (S10). This enables determination to be performed using the device-independent color space without reference to individual scanners 400. OCR pre-processing is then performed, in which image data to be input to the character recognition unit 212 is generated (S12). Because a characteristic amount is extracted from the monochrome binary image data and character recognition is carried out in the subsequent character recognition process (S14), during OCR pre-processing, monochrome binary image data that represents the character in black and the background in white is generated from the color image data expressed in terms of Lab. Here, using a method that detects the level of the background area and the level of the character area, binarization is carried out so that color characters on a white background and black characters on a color background may also be adequately recognized as characters. The original multi-level color image data (Lab data) is stored separately. In addition, filtration of noise such as isolated points, document skew correction, and crushed character and faded character correction are also performed during OCR pre-processing.

Figures 5A, 5B:
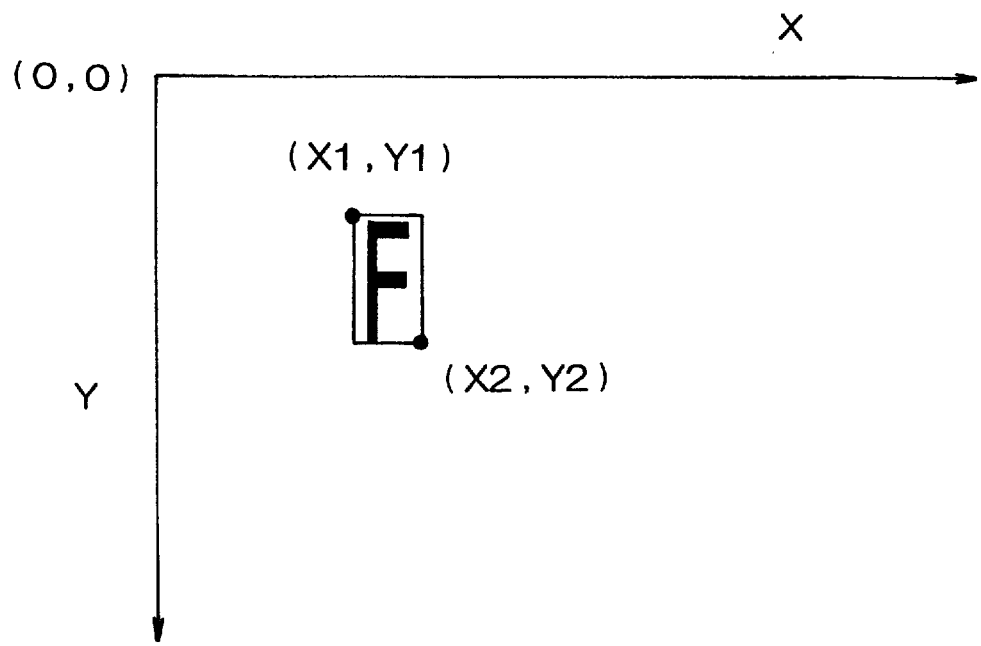
FIG. 5(a) is a drawing showing character positions.
FIG. 5(b) is a drawing showing character position in a coordinate.

Character recognition is then carried out regarding the monochrome binary image obtained from OCR pre-processing (S14). This process corresponds to the character recognition unit 212 in FIG. 1. In this character recognition process, a character area, words and characters are separated, and recognition certainty data and position data for each recognized character, as well as character codes, font type and font size, are output for each character. Recognition certainty data is expressed using a ten-unit scale based on the degree of matching between the characteristic amount of each character and a dictionary pattern. Position data for each character comprises coordinates on the character's circumscribed rectangle, as shown in FIG. 5(a) and 5(b). The left top corner of the image data is deemed the origin point.

The color of the recognized characters is then detected on an individual character basis (S16). This process corresponds to the character color detecting unit 214 in FIG. 1. While monochrome binary data is generated during OCR pre-processing, the original multi-level color image data (Lab data) is separately stored, so that the color of the character may be detected from this color image data.

Figure 6:
FIG. 6 is a drawing showing maximum value filtration.

To further explain this character color detection process, using the 3.3 maximum value filter shown in FIG. 6, filtration is performed in which the maximum value from among the adjacent 3.3 pixel group is extracted with regard to the monochrome binary image input for character recognition. This process reduces the character area. This process is performed in order to eliminate the effect of the character edges. The AND of the image comprising a binary image that has undergone reduction in this way and the character's circumscribed rectangle obtained through character recognition are obtained, and the average data for the pixels of that image is sought and is deemed the color of that character. In other words, if the jth character's color image data expressed in terms of the Lab space is Cj, $$C_j = \left( \frac{Li_{i,1}^N}{N}, \frac{ai_{i,1}^N}{N}, \frac{bi_{i,1}^N}{N} \right)$$

results. In this equation, N stands for the number of pixels in the jth character.

Figure 7:
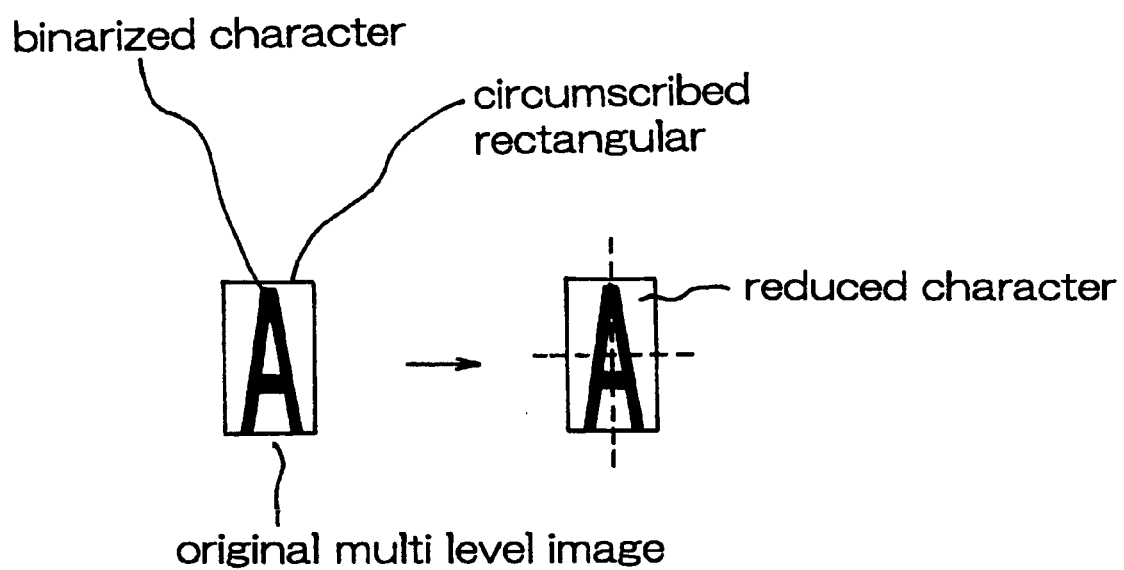
FIG. 7 is a drawing showing the process of character removal.

It is then determined whether the character should be coded (S18). Where the color changes within a single character, that character is deemed to be an element that comprises something other than a character but was erroneously recognized as a character, and coding does not take place regarding that element. The determination as to whether a color change exists in a given character is performed by dividing the circumscribed rectangle of the character, which has undergone reduction, into four sections, as shown by the dotted lines in FIG. 7, seeking the average Lab value in each section, and comparing the thus obtained Lab values. Where the average Lab values of the four sections are different from each other by a certain minimum degree, it is determined that a color change exists. If the Lab values of the four sections are Cj1 through Cj4, they are expressed as follows.

Cj1=(Lj1, aj1, bj1)

Cj2=(Lj2, aj2, bj2)

Cj3=(Lj3, aj3, bj3)

Cj4=(Lj4, aj4, bj4)

Where any of the following conditions is met, it is determined that a color change exists.

Ljn−Ljm . . . k1, ajn−ajm . . . k2, or bjn−bjm . . . k3 (where n=1, 2, 3 or 4, m=1, 2, 3, or 4, and k1, k2 and k3 are constants.)

The above-mentioned average image data Cj for one character is sought in actuality by first seeking the average value of each of the four sections, and by then taking the average of the four values once more.

Further, because words are also separated via character recognition (S14), it is also checked whether a color change exists with regard to each separate word based on the word separation results. Where a color change exists in a single word, that word is deemed an image that comprises elements other than characters but was erroneously recognized, and coding does not take place regarding that word. The determination as to whether a color change exists in a word is performed by comparing the Lab value of each color image data item Cj. In other words, where one word comprising the sth character through the eth character is separated, and if any of the following conditions is met, the characters included in that word do not undergo coding.

Lj+1−Lj . . . k4,
aj+1−aj . . . k5, or
bj+1−bj . . . k6 (where s . j . e−1, and k4, k5 and k6 are constants.)

In this way, the color of the character is detected for each recognized word, and the color characters are coded. By checking for a change in color when the color of each character is detected, erroneously recognized non-character images are excluded.

On the other hand, in addition to the above, certainty information regarding character recognition is also obtained in the character recognition process. The degree of certainty is output using a scale of one to ten, and the larger the value, the higher the degree of certainty. In this embodiment, the character is not coded when the character recognition certainty level is 7 or less. Regarding characters that are not coded, the circumscribed rectangular area including the character is extracted from the original image data on an individual character basis, and is output as a bitmap character (S20).

Finally, the recognized character codes, bitmap image data and bitmap character data are arranged on the page using a designated output file format and stored in a file (S22). Where character recognition is performed pursuant to a Scan/Print instruction, printing follows.

Figure 8:
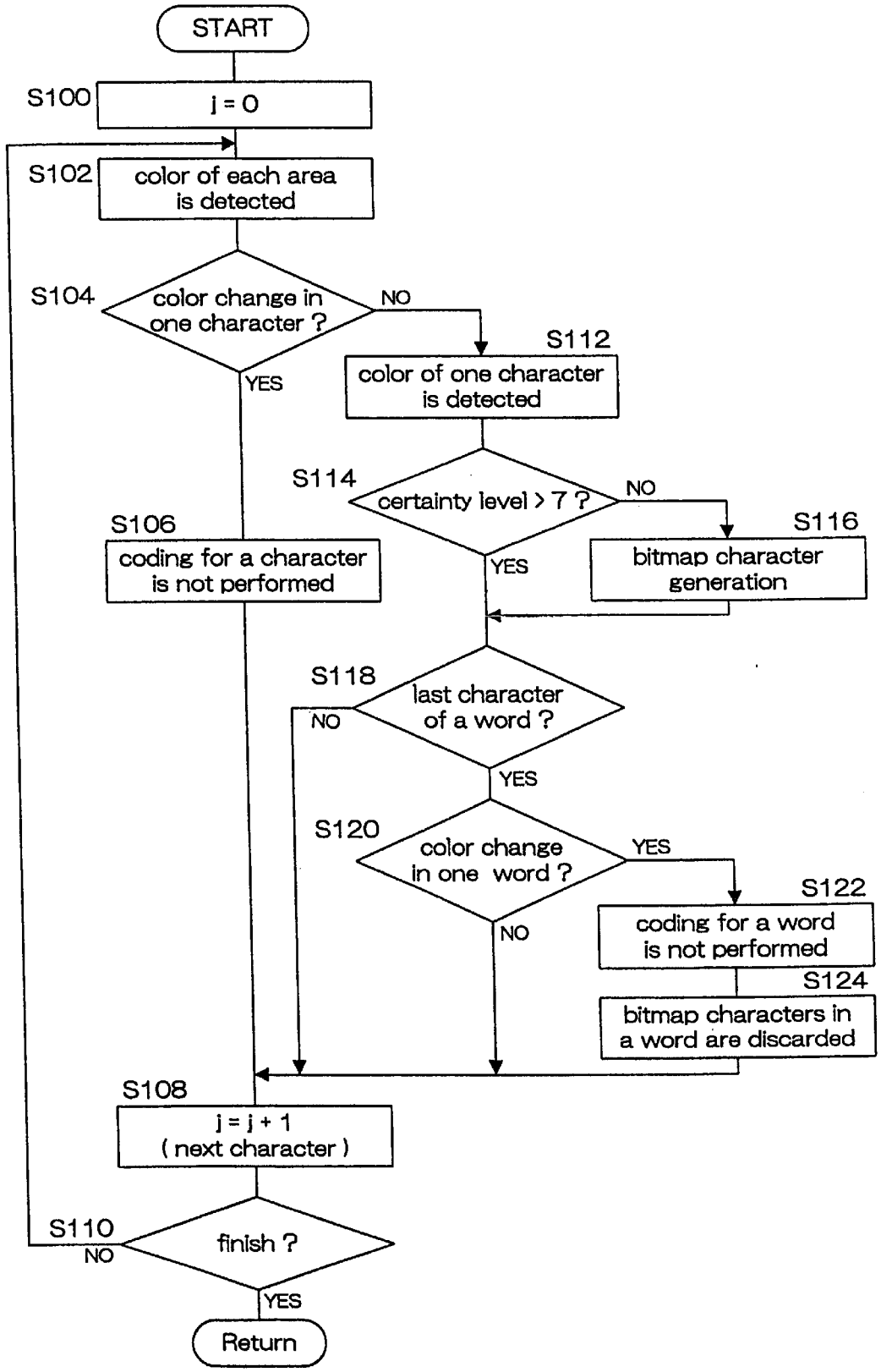
FIG. 8 is a flow chart showing the sequence from character color recognition to bitmap character creation.

FIG. 8 shows the processing sequence from the above character color detection (S16) through the bitmap process (S20). To explain the above processing in more specific terms with reference to FIG. 8, the processing begins with j, which represents the character's position, deemed as 0 (S100). The color is checked regarding each of the four areas of image data for the jth character (S102). It is then determined whether a color change exists in the character (S104). Where a color change exists, coding of the character is not performed (S106). i is then incremented (S108), and where coding of all characters is not finished (NO in S110), step S102 is returned to, and processing of the next character is performed. Where a color change does not exist in the target character (NO in S104), the color of the character is detected (S112). Subsequently, where the character recognition certainty level is 7 or less (NO in S114), a bitmap character is generated (S116). It is then determined whether the character is the last character of a word (S118), and if not, step S108 is advanced to, and processing of the next character begins. If so, it is determined whether a color change exists in the target word (S120). Where a color change exists, coding of that word is not performed (S122), and the bitmap characters in the word are discarded (S124). Step S108 is then advanced to, and processing of the next character is performed.

The reliably recognized characters are coded and output in the above processing. Characters that may have been erroneously recognized are expressed in bitmap form. In other words, the accuracy with which erroneously recognized non-character images are excluded is improved through the use of the character color information.

In this embodiment, color image data is expressed in terms of Lab, but the above processing may be carried out using a different color space, such as RGB.

In addition, the character recognition process in which characters are recognized, the color of each recognized character is detected, and erroneous recognition is determined when a color change exists in one character or in one word is carried out by the computer 200. However, a system in which the above processing is performed by a scanner 400 and the image data is transmitted to a computer 200 and printer 300, a system in which the image data is directly transmitted from a scanner 400 to a printer 300, which then performs the above processing, and a system in which the entire processing from image input to printout is performed in a color copying machine all share the same basic principle.

Because erroneously recognized non-character elements are excluded in the character recognition process in which the images are processed as monochrome binary images when the color information of the recognized character falls within certain conditions, the output of wrong character codes for images that are adjacent to characters and are erroneously recognized as characters may be prevented.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image processor comprising:
    an obtaining unit that obtains image data that corresponds to an document image including character images and other types of images;
    an extracting unit that extracts the character images from the image data;
    an detecting unit that checks whether a color change exists in the extracted character images based on the extracted image data; and
    a generating unit that generates character code data based on the image data for the character images as to which there is no color change.

2. An image processing method comprising the steps of:
    obtaining image data that corresponds to an document image including character images and other types of images;
    extracting the character images from the image data;
    checking whether a color change exists in the extracted character images based on the extracted image data; and
    generating character code data based on the image data for the character images not having a color change.

3. An optical character recognition device that converts character image data included in image data into character code data, said device comprising:
    a character image data extracting unit that extracts the character image data from the image data;
    a color change detecting unit that checks whether a color change exists in the character image data extracted by the character image data extracting unit; and
    a converting unit that converts the character image data as to which no color change was detected by the color change detecting unit into character code data.

4. An optical character recognition device according to claim 3, wherein said converting unit does not convert character image data including a color change into character code data.

5. An optical character recognition device according to claim 3, wherein said character image data extracting unit extracts character image data on an individual character basis.

6. An optical character recognition device according to claim 3, wherein said character image data extracting unit extracts character image data on an individual word basis.

7. An optical character recognition method that converts the character image data included in image data into character code data, comprising the steps of:

extracting character image data from the image data;

checking whether a color change exists in the extracted character image data; and converting character image data as to which there is no color change into character code data.

8. A computer-readable recording medium that records an optical character recognition program that converts the character image data included in image data into character code data, said program comprising the steps of:

extracting character image data from the image data;

checking whether there is a color change in the extracted character image data; and converting character image data as to which there is no color change into character code data.

9. An image processor comprising:

an obtaining unit that obtains image data that corresponds to an document image including character images and other types of images;

an extracting unit that extracts the character images from the image data;

an detecting unit that checks whether a color change exists in the extracted character images based on the extracted image data; and a control unit that generates character code data based on the image data for the character images not having a color change, and does not generate character code data based on the image data for the character images having a color change.

\* \* \* \* \*